(12) United States Patent
Chapman

(10) Patent No.: US 9,400,165 B2
(45) Date of Patent: Jul. 26, 2016

(54) POSITION SENSING DEVICE FOR TRANSIT SHAFT AND ARM ASSEMBLY

(71) Applicant: WABTEC HOLDING CORP., Wilmerding, PA (US)

(72) Inventor: Matthew Chapman, Wheeling, IL (US)

(73) Assignee: Wabtec Holding Corp., Wilmerding, PA (US)

( * ) Notice: Subject to any disclaimer, the term of this patent is extended or adjusted under 35 U.S.C. 154(b) by 393 days.

(21) Appl. No.: 14/004,288

(22) PCT Filed: Sep. 25, 2012

(86) PCT No.: PCT/US2012/057013
§ 371 (c)(1),
(2) Date: Sep. 10, 2013

(87) PCT Pub. No.: WO2013/048998
PCT Pub. Date: Apr. 4, 2013

(65) Prior Publication Data
US 2014/0340071 A1   Nov. 20, 2014

Related U.S. Application Data

(60) Provisional application No. 61/541,131, filed on Sep. 30, 2011.

(51) Int. Cl.
*G01N 15/12* (2006.01)
*G01B 7/30* (2006.01)
*G01D 5/347* (2006.01)

(52) U.S. Cl.
CPC .............. *G01B 7/30* (2013.01); *G01D 5/34738* (2013.01)

(58) Field of Classification Search
CPC ............................... G01B 7/30; G01D 5/34738
USPC ......................................................... 324/71.1
See application file for complete search history.

(56) References Cited

U.S. PATENT DOCUMENTS

| | | | |
|---|---|---|---|
| 3,838,234 A | 9/1974 | Peterson | |
| 4,016,381 A | 4/1977 | Rodseth | |
| 4,049,934 A | 9/1977 | Newlon | |
| 4,066,857 A | 1/1978 | Suska | |
| 4,132,890 A * | 1/1979 | Garcia | G01P 3/486 250/231.13 |
| 4,168,409 A | 9/1979 | McNinch | |

(Continued)

FOREIGN PATENT DOCUMENTS

| | | |
|---|---|---|
| DE | 10109141 A1 | 9/2001 |
| DE | 10024230 A1 | 11/2001 |

(Continued)

*Primary Examiner* — Melissa Koval
*Assistant Examiner* — Courtney McDonnough
(74) *Attorney, Agent, or Firm* — The Webb Law Firm

(57) ABSTRACT

A rotational position sensing device for sensing rotation of an axially adjustable shaft of a shaft and arm assembly of a door that does not require readjustment after the shaft and arm assembly are adjusted includes a fixed bracket supporting a post, a position sensor having an upper portion, a lower portion and an extended portion, and a rotating portion. The extended portion extends from the upper portion of the position sensor and constrains the post of the bracket such that the upper portion of the position sensor is unable to axially rotate relative to the bracket. The rotating section is adapted to be fixed to the shaft and engage with the lower portion of the position sensor, such that the rotating portion rotates relative to the upper portion of the position sensor.

10 Claims, 9 Drawing Sheets

(56) References Cited

U.S. PATENT DOCUMENTS

| | | | |
|---|---|---|---|
| 4,211,990 A | 7/1980 | Gwozdz | |
| 4,284,861 A | 8/1981 | Senften | |
| 4,841,283 A | 6/1989 | Bubliewicz | |
| 5,717,380 A | 2/1998 | Zehrung | |
| 5,942,890 A | 8/1999 | Reicks et al. | |
| 6,261,182 B1 | 7/2001 | Chino et al. | |
| 6,373,006 B1 | 4/2002 | Toki | |
| 6,667,449 B2 | 12/2003 | Wecke et al. | |
| 7,610,684 B2 | 11/2009 | Steinich | |
| 2004/0263159 A1 | 12/2004 | Herbert et al. | |
| 2007/0084122 A1 | 4/2007 | Watanabe et al. | |
| 2008/0309118 A1* | 12/2008 | Kohlstrand | E05D 11/1007 296/146.1 |
| 2010/0295542 A1 | 11/2010 | Pellegrini | |
| 2011/0144867 A1 | 6/2011 | Tezak et al. | |

FOREIGN PATENT DOCUMENTS

| | | | | |
|---|---|---|---|---|
| DE | 10252205 A1 | 6/2004 | | |
| EP | 0985910 A1 | 3/2000 | | |
| EP | 1293998 B1 | 9/2010 | | |
| JP | 115555 A | 1/1999 | | |
| JP | 0985910 A1 * | 3/2000 | | F16D 1/06 |
| JP | 2003177035 A | 6/2003 | | |

* cited by examiner

POSITION SENSING DEVICE FOR TRANSIT SHAFT AND ARM ASSEMBLY

BACKGROUND OF THE INVENTION

1. Field of the Invention

The present invention pertains to the field of position sensing devices, particularly to rotational position sensing devices for measuring the rotation of a shaft and arm assembly typically used for doors of transit vehicles such as buses and trains.

2. Description of Related Art

Rotational position sensing devices for measuring the rotation of a shaft and arm assembly used for transit vehicle doors are known in the art. Such devices are used in situations where it is desirable to properly determine the position (i.e., open, closed, partially open, or a particular angle) of a vehicle door operating with a shaft and arm assembly.

Transit vehicle doors supporting a shaft and arm assembly may include, but are not limited to, slide-glide doors, plug doors, swing doors and bi-fold doors as are known in the art. Further, it may be desirable to fasten position sensing devices to shaft and arm assemblies used in other contexts (i.e., for doors or other devices utilizing a rotatable shaft) to measure or otherwise determine the axial rotation of a shaft relative to a fixed structure.

In many cases, measuring the rotational position of a shaft of a shaft and arm assembly requires a position sensor (i.e., a potentiometer, rotary encoder, or other like device) to be fixed to the shaft and arm assembly of a door. One method of fixing a position sensor to a shaft and arm assembly involves securing the shaft portion of the sensor to the shaft and arm assembly and securing the housing portion of the sensor with a fastener mounted to the structure (i.e., the vehicle, door, wall or other structure). The disadvantage of this method is that any non-height adjustments of the shaft and arm assembly relative to the structure will require readjustment of the position sensor.

Another method known in the art to fix a position sensor to a shaft and arm assembly of a vehicle door requires fixing the position sensor directly to the adjuster shaft of the shaft and arm assembly. However, if such a method is employed with a traditional position sensing device, the position sensor will require readjustment every time the height of the shaft and arm assembly is adjusted.

SUMMARY OF THE INVENTION

It is the object of this invention to provide a rotational position sensor device for a transit door shaft and arm assembly that does not require readjustment after the shaft and arm assembly is adjusted or readjusted relative to the door or other structure, including readjustments of height.

According to one aspect of the present invention, there is provided a rotational position sensing device for sensing rotation of an axially adjustable shaft comprising a fixed bracket supporting a post and a position sensor having an upper portion, a rotating portion and a fork. The fork extends from the upper portion and slidably engages the post such that the upper portion is prevented from axially rotating relative to the fixed bracket. The rotating portion is fastened to the shaft and axially rotates relative to the upper portion.

According to another aspect of the present invention, there is provided a rotational position sensing device for sensing rotation of an axially adjustable shaft, comprising a fixed bracket supporting a post and a position sensor comprising an upper fixed portion, a rotating portion and a forked extension. The forked extension protrudes from the upper portion and slidably engages the post such that the upper portion is prevented from axially rotating relative to the fixed bracket. The rotating portion is configured to be fastened to the shaft.

According to a further aspect of the present invention, there is provided a rotational position sensing device for sensing rotation of an axially adjustable shaft, comprising a fixed bracket supporting an extended member and a position sensor comprising a housing portion, an extended portion, and a rotating portion. The extended portion extends laterally from the housing portion and engages the extended member of the fixed bracket such that the position sensor is unable to rotate relative to the fixed bracket. The rotating portion is adapted to be fixed to a top part of a shaft such that the rotating portion axially rotates in correspondence with the shaft and relative to the housing portion.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

Further features and other objects and advantages will become apparent from the following detailed description made with reference to the drawings in which.

DESCRIPTION OF THE PREFERRED EMBODIMENTS

Figure 1:
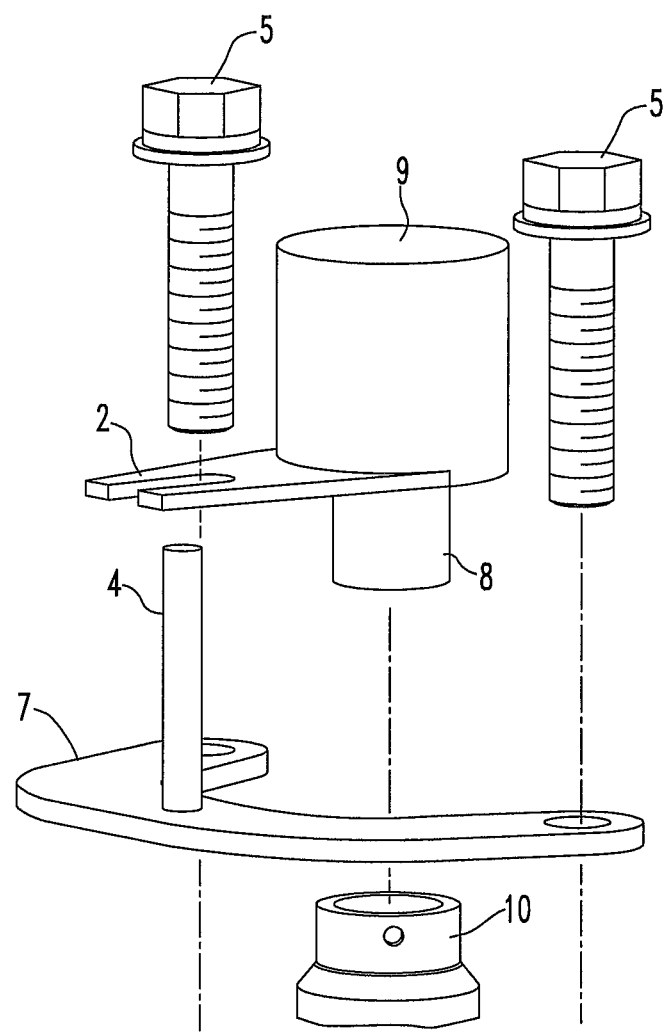
FIG. 1 is an exploded perspective view of an embodiment of this invention.

For purposes of the description hereinafter, the terms "end", "upper", "lower", "right", "left", "vertical", "horizontal", "top", "bottom", "lateral", "longitudinal" and derivatives thereof shall relate to the invention as it is oriented in the drawing figures. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting. Further, it is to be understood that the invention may assume various alternative variations and step sequences, except where expressly specified to the contrary.

FIG. 1 shows an exploded view of an embodiment of the position sensing device of the present invention. The shaft and arm assembly, to which the position sensing device may be fastened, is not shown. A position sensor 9 has an extended portion (forked extension or fork) 2 and a rotating portion 8. The rotating portion 8 is shown in FIG. 1 rotationally engaged with the bottom of the position sensor 9. The rotating portion 8 may be a separate component that engages with the bottom of the position sensor 9 or may be non-removable from the position sensor 9. The rotating portion 8 rotates axially in correspondence with the shaft 10 of a shaft and arm assembly and rotates in relation to the position sensor 9, including the forked extension 2. A bracket 7 supports a post 4, which may include but is not limited to an extended member, protrusion or like extension that is either formed as part of the bracket 7 or as a separate unit that is fixed or attached to the bracket 7.

The position sensor 9 may be any device capable of sensing, measuring or detecting the axial rotation (angular position) of one of its components or that of another object. Possible but non-limiting examples of capable devices include potentiometers, rotary encoders (shaft encoders) and other electro-mechanical devices that convert the angular position or motion of a shaft to an analog or digital code. It will be appreciated by one skilled in the art that the position sensor 9 is not limited to electro-mechanical devices and may include, for example, optical and inductive sensors and other non-contact or contact angular measurement devices.

Figure 2:
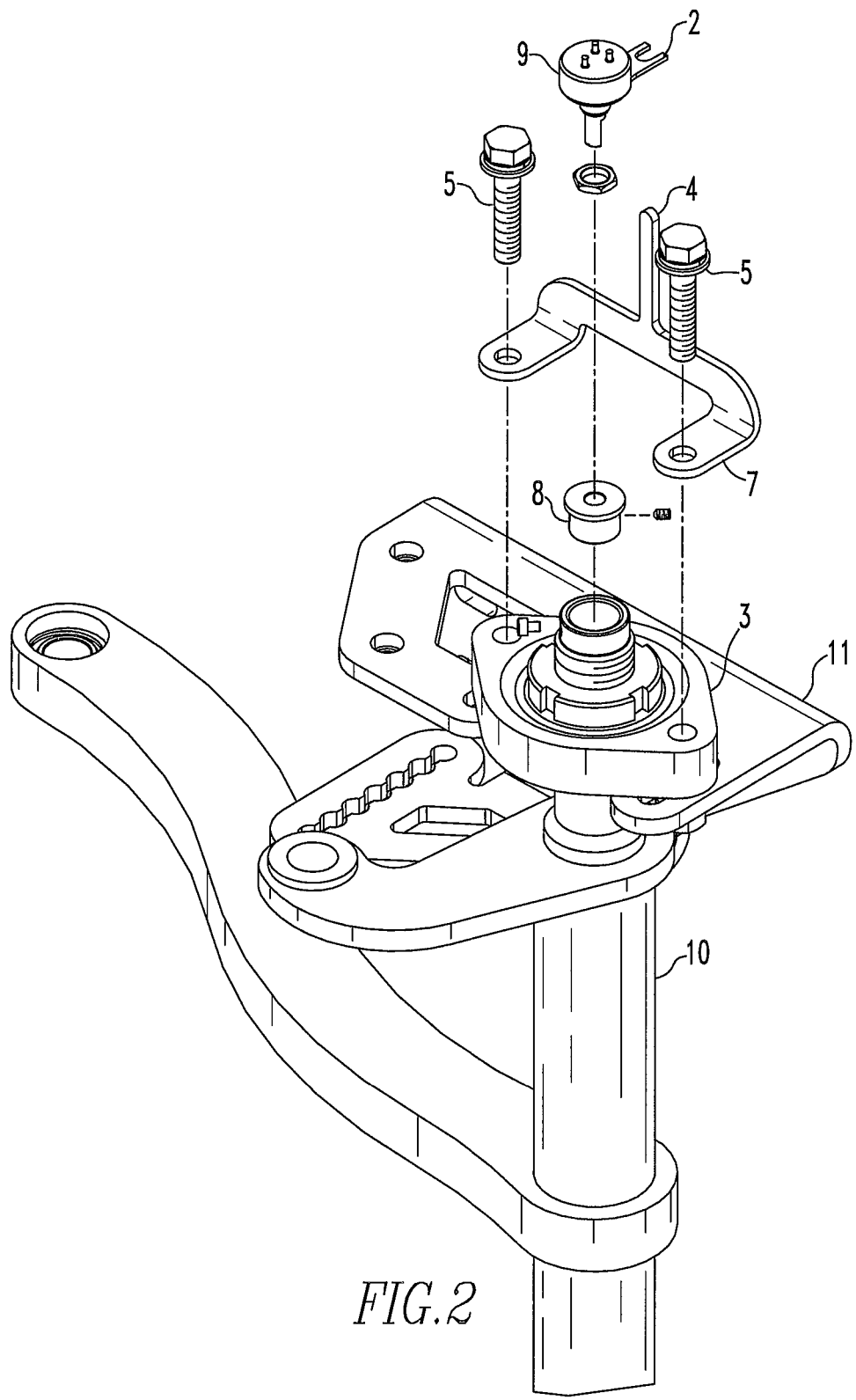
FIG. 2 is an exploded perspective view of another embodiment of this invention showing the position sensing device unassembled and the components of the shaft and arm assembly.

Referring now to FIG. 2, an exploded view of an embodiment of the position sensing device is shown above an assembled shaft and arm assembly. The shaft and arm assembly includes a shaft 10, a lower bracket 11 and a bearing 3. The shaft 10 extends through the bearing 3 and axially rotates in relation to the bearing 3. The position sensor 9 has an extended portion (forked extension or fork) 2 that extends laterally from the sensor 9. A bracket 7 is shown having means for being fixed to the bearing 3 and/or the lower bracket 11 associated with the shaft and arm assembly.

In the embodiment shown in FIG. 2, the position sensor is a potentiometer or other like device having a rotatable extension (referred to as an axle or rotatable axle in standard potentiometers) 13 extending therefrom that rotates relative to the remainder of the position sensor 9, including the forked extension 2.

The rotatable axle 13 is engaged by a rotating portion 8 adapted to be received by, or otherwise coupled with, the top of a shaft 10. The rotating portion 8 is fixed or coupled to the shaft 10 such that the rotating portion 8 of the position sensor 9 axially rotates in correspondence with the axial rotation of the shaft 10. Further, the rotating portion 8 is able to be rotated relative to the bracket 7, the main (or housing) portion of the position sensor 9 and the extended portion (forked extension) 2 of the position sensor 9. When assembled, the post 4 supported by or extending from the bracket 7 fits between the prongs of the forked extension 2, or is otherwise engaged by the extended portion 2, slidably engaging the post 4 and preventing the post 4 and the bracket 7 from rotating relative to the forked extension 2 or the position sensor 9. In such a configuration, the axial position of the rotating portion 8 (and the rotatable axle 13 of the position sensor 9, in embodiments where the sensor is a potentiometer or like electro-mechanical device) changes in accordance with the axial position of the shaft 10, while the position sensor 9 (except for the rotatable axle 13 in certain embodiments) remains in a fixed axial position corresponding to that of the bracket 7 and post 4, bearing 3 and lower bracket 11 of the shaft and arm assembly.

In a preferred but non-limiting embodiment of the present invention, the extended portion 2 that extends from the position sensor 9 has a forked end adapted for receiving the post 4. Further non-limiting embodiments of the extended portion 2 may include means for engaging and/or constraining the post 4 such as an aperture, latch, clasp or other like mechanism or design.

Figure 3:
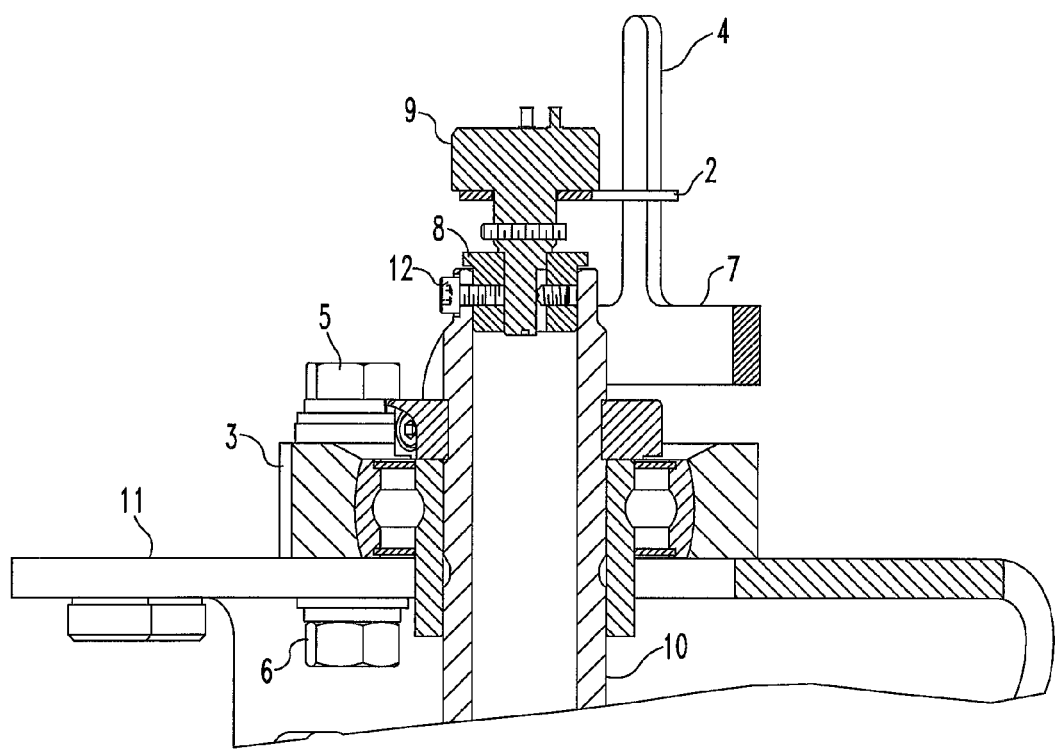
FIG. 3 is a sectional view taken along the line AA of FIG. 4.
Figure 4:
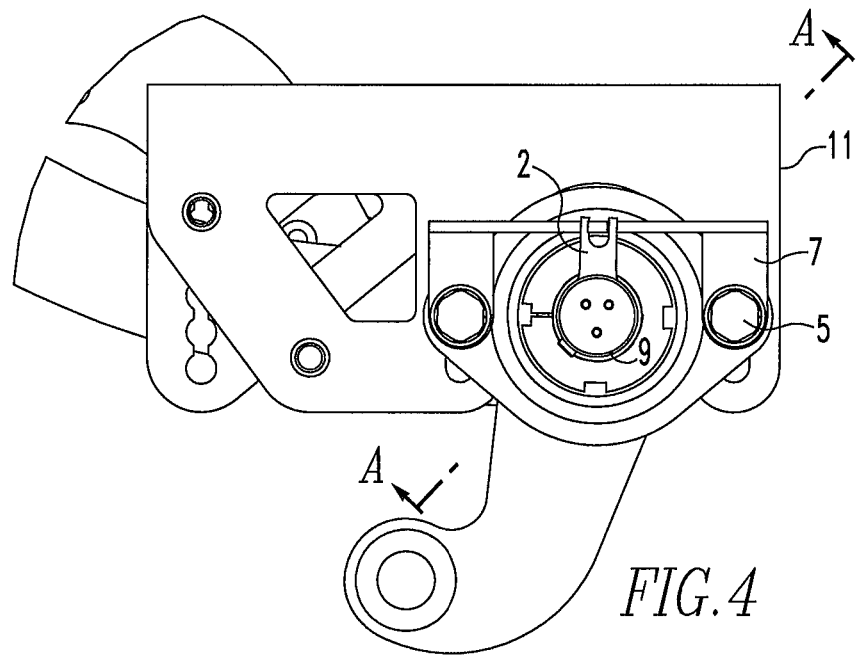
FIG. 4 is a top view of the shaft and sensing device.

Referring now to FIG. 3, a sectional view taken along the line AA of FIG. 4 is shown. The rotating portion 8 is received by the shaft 10 and fastened to the shaft with a fastening means 12 that may include, but is not limited to, a bolt (i.e., hex bolt, carriage bolt, eye bolt, anchor bolt, set bolt, etc) with or without a nut or anchor pin, a screw (i.e., set screw, standard screw, etc), a pin, or other like hardware.

In a preferred but non-limiting embodiment of the present invention, bolts 5 fasten the bracket 7 to an object or structure (i.e., the bearing 3 and lower bracket 11) through apertures in the bracket 7 which receive the bolts 5. Once fastened to the shaft 10, the rotating portion 8 rotates in correspondence with the axial rotation of the shaft 10, relative to the position sensor 9, bracket 7, bearing 3, lower bracket 11, and other fixed components.

Figure 5:
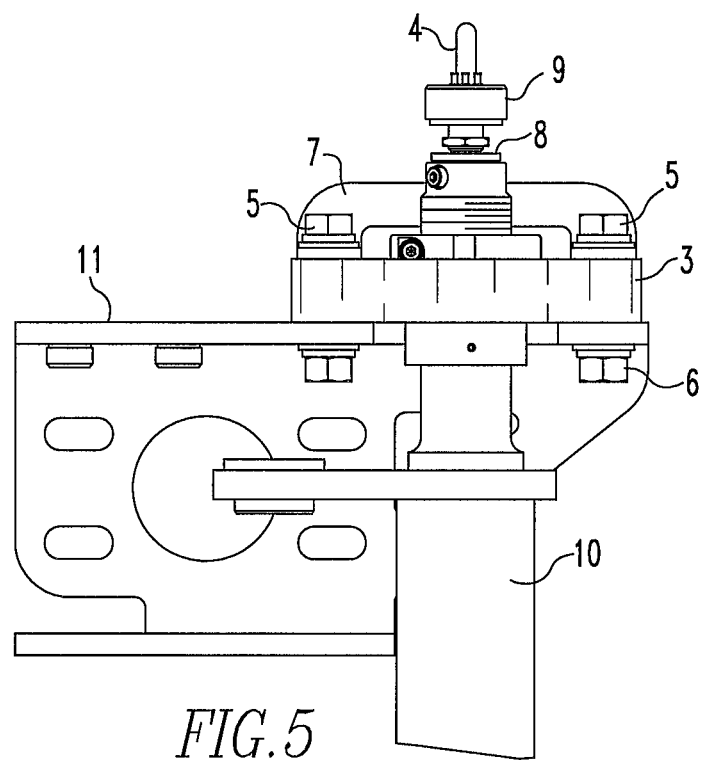
FIG. 5 is a front view of an embodiment of this invention showing the position sensing device assembled and fixed to the shaft and arm assembly.
Figure 6:
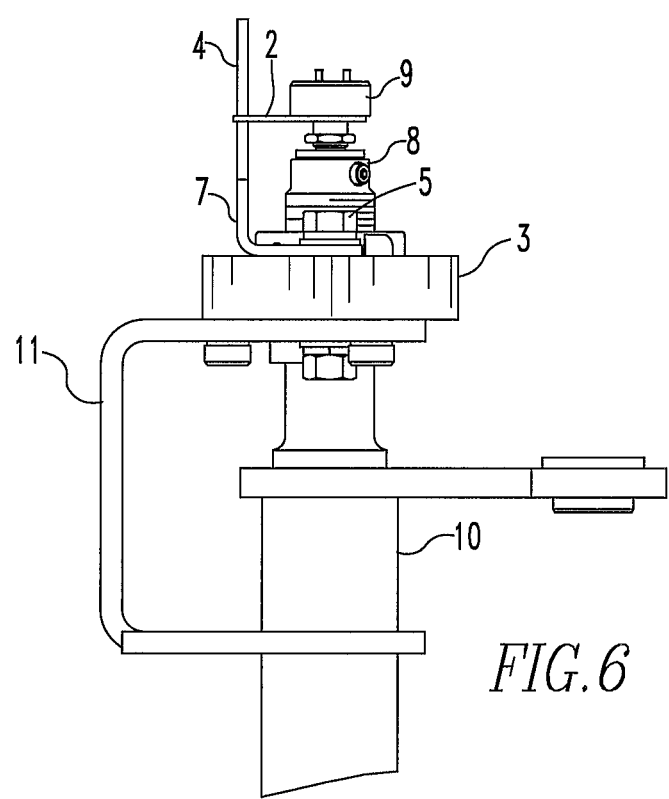
FIG. 6 is a side view of an embodiment of this invention assembled and fastened to the shaft and arm assembly.

FIG. 4 shows a top view of the position sensing device and shaft and arm assembly shown in FIG. 2 and FIG. 3. The same embodiment is also shown from a front view in FIG. 5 and from a side view in FIG. 6.

Figure 7:
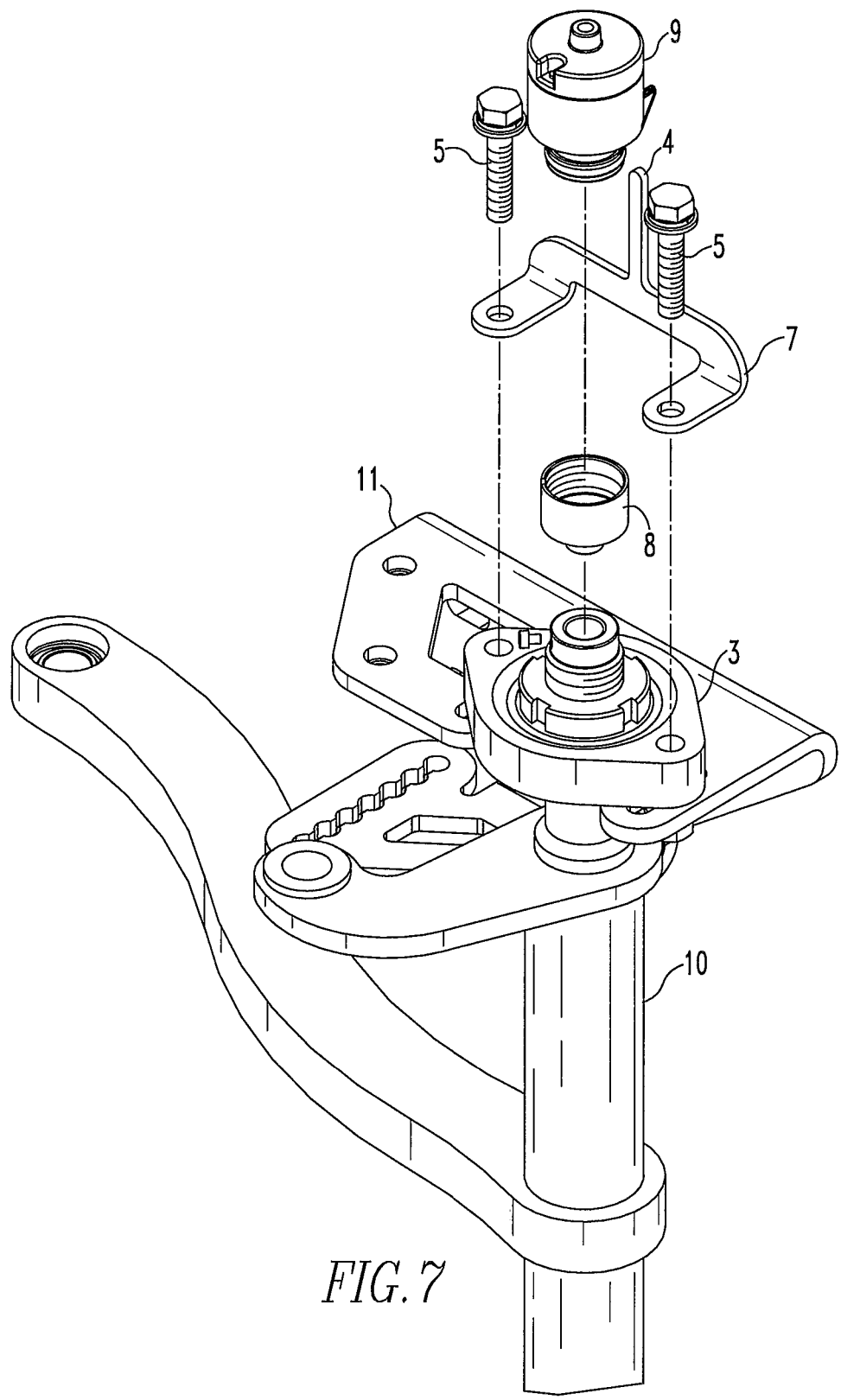
FIG. 7 is an exploded perspective view of the embodiment of this invention shown in FIG. 1 above the components of the shaft and arm assembly.

FIG. 7 shows an exploded view of another embodiment, employing a different position sensor 9 than the embodiments depicted by FIGS. 2-6. The lower portion of the position sensor 9 is adapted to engage or be engaged by a rotating portion 8 that rotates relative to the position sensor 9. The rotating portion 8 is adapted to be fixed (i.e., fastened or coupled) to the top part of a shaft 10 of a shaft and arm assembly such that the rotating portion 8 axially rotates in correspondence with the axial position of the shaft 10. A bracket 7 supports a post (or extension) 4 that, when assembled, is constrained by the forked extension 2 (not fully visible in FIG. 7) extending from the position sensor 9.

Figure 8:
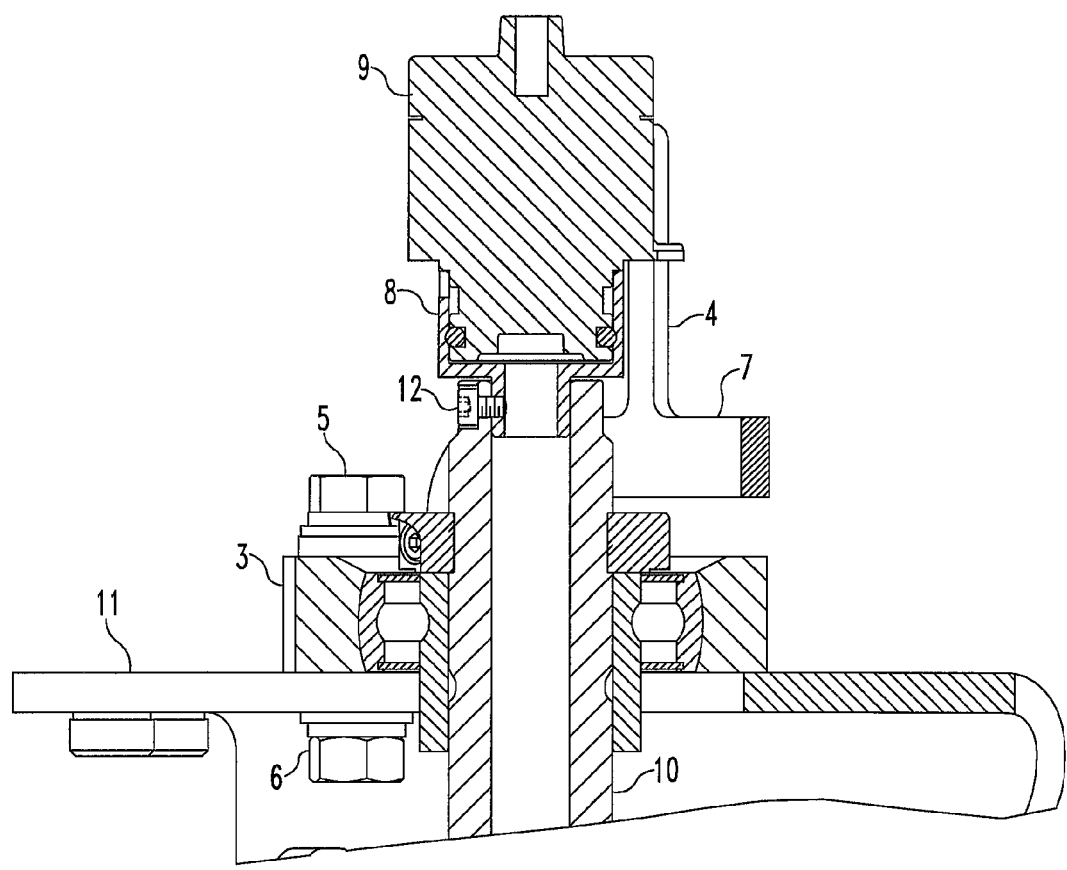
FIG. 8 is a sectional view taken along the line BB of FIG. 9, showing the position sensing device assembled and fixed to the shaft and arm assembly.
Figure 9:
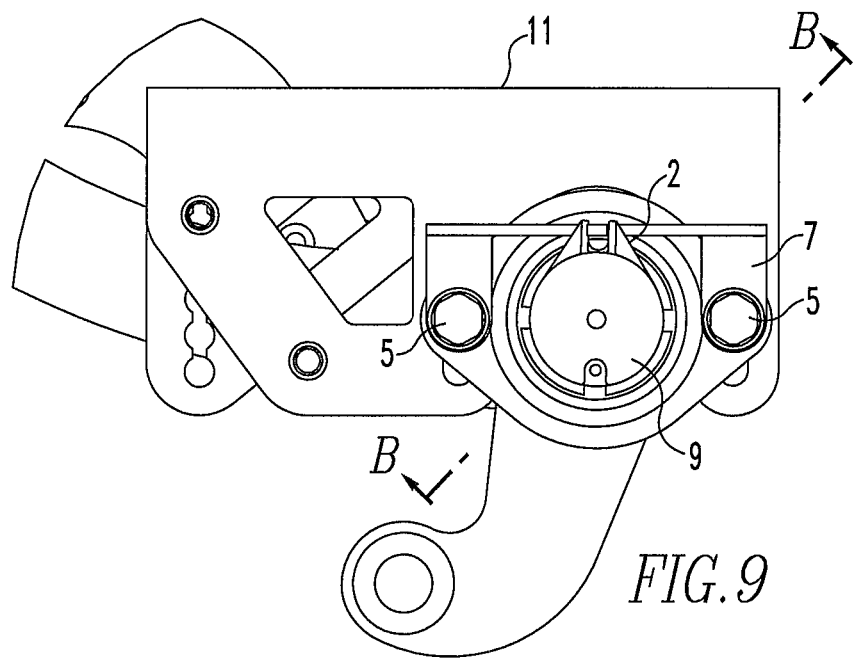
FIG. 9 is a top view of the embodiment shown in FIG. 1 assembled and fastened to the shaft and arm assembly.

FIG. 8 is a sectional view taken along the line BB of FIG. 9. The rotating portion 8 is fastened to the shaft 10 with a fastening means 12 such that the rotating portion axially rotates in correspondence with the rotation of the shaft 10.

Figure 10:
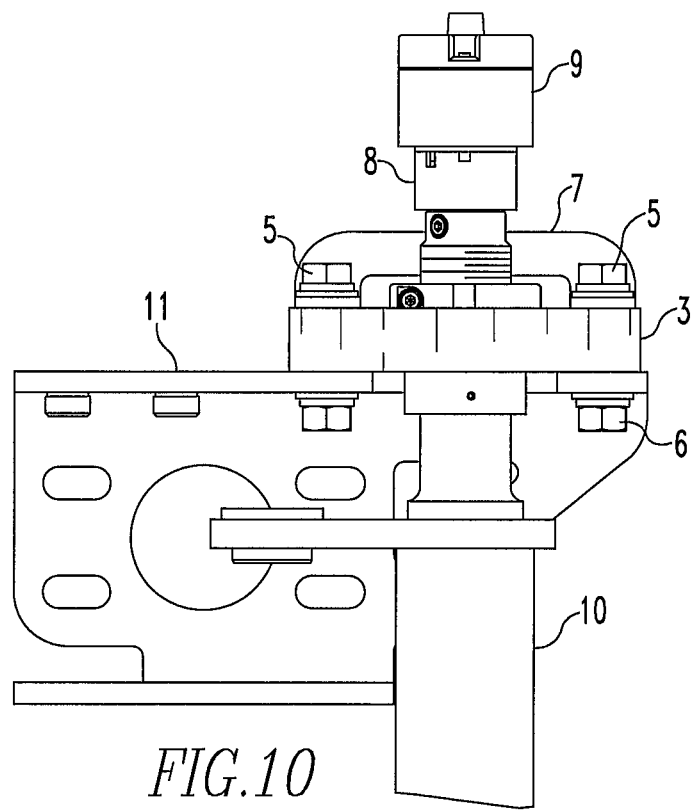
FIG. 10 is a front view of the embodiment shown in FIG. 1 assembled and fastened to the shaft and arm assembly.
Figure 11:
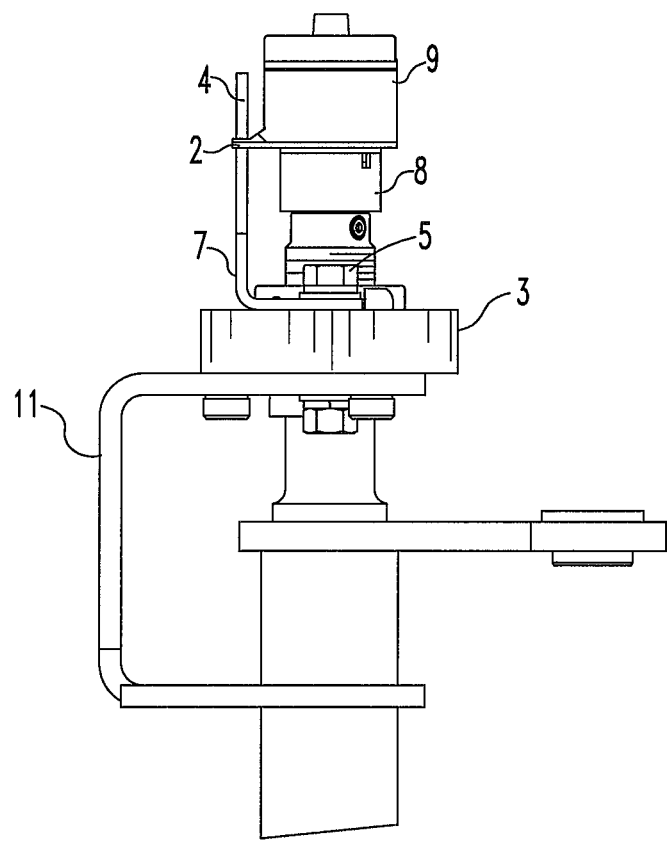
FIG. 11 is a side view of the embodiment shown in FIG. 1 assembled and fastened to the shaft and arm assembly.

FIG. 9 shows a top view of the position sensing device and shaft and arm assembly shown in FIG. 1 and FIG. 7. A front view of the same embodiment is depicted by FIG. 10. A side view of the same embodiment is shown in FIG. 11.

By being fixed to a shaft and arm assembly, the shaft 10 may be adjusted without requiring readjustment of the position sensing device. If, for example, the height of the shaft 10 is adjusted, the position sensor 9 will remain axially fixed because the forked extension 2 will remain slidably engaged with the post 4 of the fixed bracket 7, at a varying linear position along the post 4.

The invention claimed is:

1. A rotational position sensing device and shaft axially adjustable as a unit held by a bearing assembly comprising:
   a bearing having relatively rotatable inner and outer races,
   a bracket fixed to and supporting the outer race of the bearing,
   a shaft axially movable with the inner race and supported therein for rotation, said shaft having external threads adjacent the bearing, a post generally parallel to the shaft and supported by said bracket, an internally threaded ring turned on the threads of the shaft and resting on the inner race of the bearing to support the axial position of the shaft, a position sensor comprising a housing portion and a rotating portion, the rotating portion secured to the end of the shaft above the bearing, the housing portion having an extended forked portion extending from the housing portion and slidably engaging the post such that the housing portion is unable to rotate relative to the bracket, whereby the axial position of the rotational positional sensing device and the shaft can be adjusted as a unit by turning the threads of the internally threaded ring relative to the external threads on the shaft.

2. The rotational position sensing device of claim 1, wherein the fixed bracket is u-shaped.

3. The rotational position sensing device of claim 1, further comprising means for fastening the bracket to at least one of the following: a bearing, a portion of a shaft and arm assembly, a fixed portion of a vehicle, or any combination thereof.

4. The rotational position sensing device of claim 1, further comprising means for fastening the rotating portion to the shaft.

5. The rotational position sensing device of claim 1, wherein the shaft is part of a shaft and arm assembly for a transit vehicle door.

6. The rotational position sensing device of claim 1, further comprising means for fastening the bracket to at least one of the following: a bearing, a portion of a shaft and arm assembly, a fixed portion of a vehicle, or any combination thereof.

7. The rotational position sensing device of claim 1, wherein the extended portion has a forked end which engages the post.

8. The rotational position sensing device of claim 1, wherein the rotating portion is fastened to a top portion of the shaft.

9. The rotational position sensing device of claim 1, wherein the position sensor is one of the following: potentiometer, rotary encoder, optical sensor, or inductive sensor.

10. The rotational position sensing device of claim 1, wherein the position sensor further comprises a rotatable extension, the rotatable extension extending from the position sensor such that it engages with the rotating portion and rotates relative to the position sensor.

\* \* \* \* \*